United States Patent [19]
Demoise, Jr. et al.

[11] Patent Number: 6,026,938
[45] Date of Patent: Feb. 22, 2000

[54] GUIDE PIN AND BEARING FOR A DISC BRAKE

[75] Inventors: Thomas Edwin Demoise, Jr., Osceola; James Donald Borntrager, South Bend; Tim Yoko, South Bend; Brian Edward Roach, South Bend, all of Ind.

[73] Assignee: Robert Bosch Technology Corp, Broadview, Ill.

[21] Appl. No.: 09/141,279

[22] Filed: Aug. 27, 1998

[51] Int. Cl.[7] .................................................. F16D 65/02
[52] U.S. Cl. ................................. 188/73.44; 188/73.35
[58] Field of Search ........................... 188/73.45, 73.44, 188/73.35, 73.37, 205 R, 205 A, 206 R, 206 A; 74/18.2

[56] References Cited

U.S. PATENT DOCUMENTS

| 4,084,665 | 4/1978 | Burnett ................................. 188/73.45 |
| 4,310,075 | 1/1982 | Johannesen et al. ................. 188/73.45 |
| 4,372,428 | 2/1983 | Delauncy et al. .................... 188/73.45 |
| 4,393,963 | 7/1983 | Oltmanns, Jr. et al. ............. 188/73.45 |

*Primary Examiner*—Douglas C. Butler

[57] ABSTRACT

A guide pin (24) attached to a caliper (21) and located in a bore (28) of an anchor bracket or carrier member (22) in a disc brake (10). The carrier member (22) and caliper (21) move with respect to each other in response to a force developed by a piston for urging friction pads (18,20) into engagement with a rotor (12) to effect a brake application. The guide pin (24) is characterized by a head (36) having a shaft (38) extending therefrom into a bearing (62,64) which is located between the shaft (38) and housing surrounding the bore (28). The bearing (62,64) has dissimilar resistances to stiffness in a radial plane than in a tangential plane such that vibratory forces are attenuated and dynamic forces generated during a brake application are absorbed to maintain alignment between the friction pads (18,20) and rotor (12).

6 Claims, 2 Drawing Sheets

U.S. Patent     Feb. 22, 2000     Sheet 1 of 2     6,026,938
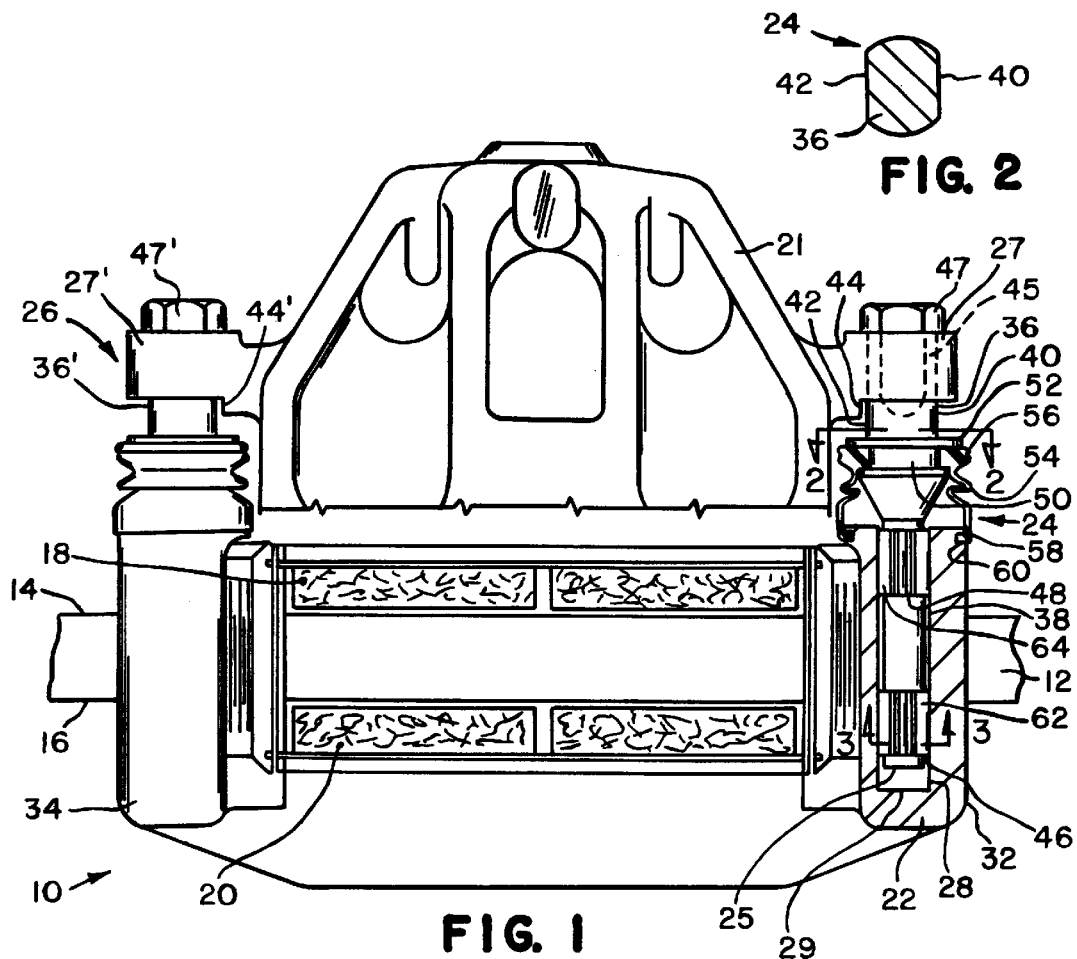
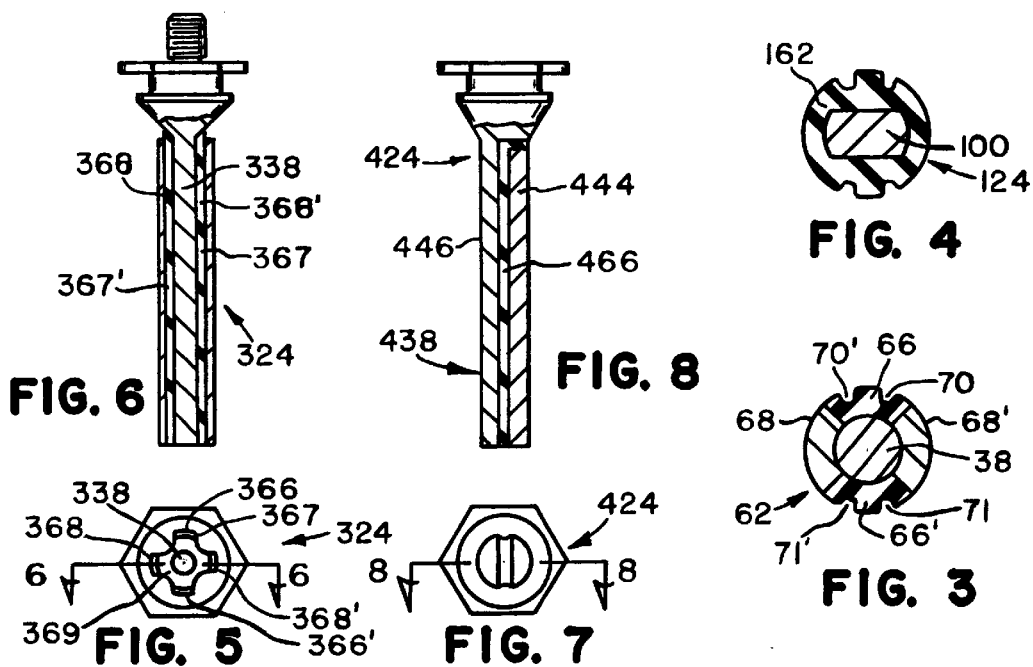

GUIDE PIN AND BEARING FOR A DISC BRAKE

This invention relates to means for resiliently restraining a guide pin of a disc brake differently in a radial direction than in an arcuate direction to accommodate for different levels of stresses created by vibration and dynamic loads.

BACKGROUND OF THE INVENTION

In disc brakes, such as illustrated in U.S. Pat. Nos. 4,446,948, 5,526,904, 5,562,187 and 5,785,156 wherein guide pins are provided to accommodate sliding motion between a carrier member and a caliper the elimination of noise caused by rattling of components is a concern.

One way of reducing noise is through rubber bushings as disclosed in U.S. Pat. No. 4,446,948 which insulate guide pins. In addition, compensation for manufacturing tolerances can be achieved by tightly align one guide pin in a first bore while allowing a second guide pin to be loosely retained in a second bore as disclosed in U.S. Pat. No. 5,526,904. In this arrangement a resilient guide bushing which surrounds a portion of the second guide pin to sustain a desired alignment between friction pads and a rotor.

Further, noise caused by rattling of the components in a disc brake have been greatly reduced through the use of resilient projection extending from the guide pins to retain the components in engagement as disclosed in U.S. Pat. No. 5,562,187. Unfortunately, such pins are costly to produce and as a result have not yet been endorsed by the industry.

While the resilient bushings and special guide pins disclosed in the prior art function in a satisfactory manner, it has been observed that radial forces developed when a disc brake is subjected to vibration such as experienced in travel on rough roads are different that tangential forces caused by dynamic loading during a brake application.

In the present invention, guide pins retained in a carrier member are aligned within bores in caliper by relatively low cost and easy to manufacture bearing means having dissimilar resistance's to stiffness in a radial plane than in a tangential plane. The bearing means is designed to attenuate vibratory forces and resultant noise while allowing tangential forces created by dynamic forces generated during a brake application to be absorbed such that the friction pads and rotor are maintained in a desired alignment.

SUMMARY OF THE INVENTION

A primary object of the present invention is to provide a bearing for a guide pin wherein different levels of stiffness are provided to resist radial and tangential forces.

According to this invention, a disc brake has first and second guide pins attached to caliper and located in a bore of an anchor bracket or carrier member. The carrier member and caliper move with respect to each other in response to forces developed by a piston to urge friction pads into engagement with a rotor to effect a brake application. Each guide pin is characterized by a head having a shaft which extends into a corresponding bore in the anchor bracket or carrier member. A plurality of bearing means are located between each shaft and housing surrounding such bore. Each bearing means has a cross-sectional profile that provides a different stiffness in a radial plane than in a tangential plane such that different levels of vibrations or movements can be modified to assure that the friction pads and rotor remain in a desired alignment.

An advantage of a brake system using this invention resides in an easy to select bearing configuration which has a different level of stiffness in a radial plane than in a tangential plane to compensation in manufacturing tolerances between guide pins secured to a carrier and bores in a caliper while at the same time attenuating vibrations of components which could produce noise.

BRIEF DESCRIPTION OF THE DRAWINGS

FIG. 1 is a top plan view of a disc brake which includes bearing means and guide pins made according to the principals of the present invention for aligning a carrier member and with a caliper;

FIG. 2 is a partial sectional view taken along lines 2—2 of FIG. 1; and

FIG. 3 is a partial sectional view taken along lines 3—3 of a bearing in FIG. 1;

FIG. 4 is a sectional view of an another embodiment for a bearing for use in the disc brake of FIG. 1;

FIG. 5 is a top view of another guide pin for use in the disc brake of FIG. 1;

FIG. 6 is a sectional view taken along line 6—6 of FIG. 5;

FIG. 7 is a top view of still another guide pin for use in the disc brake of FIG. 1;

FIG. 8 is a sectional view taken along line 8—8 of FIG. 7; and

DETAILED DESCRIPTION

Figure 1A:
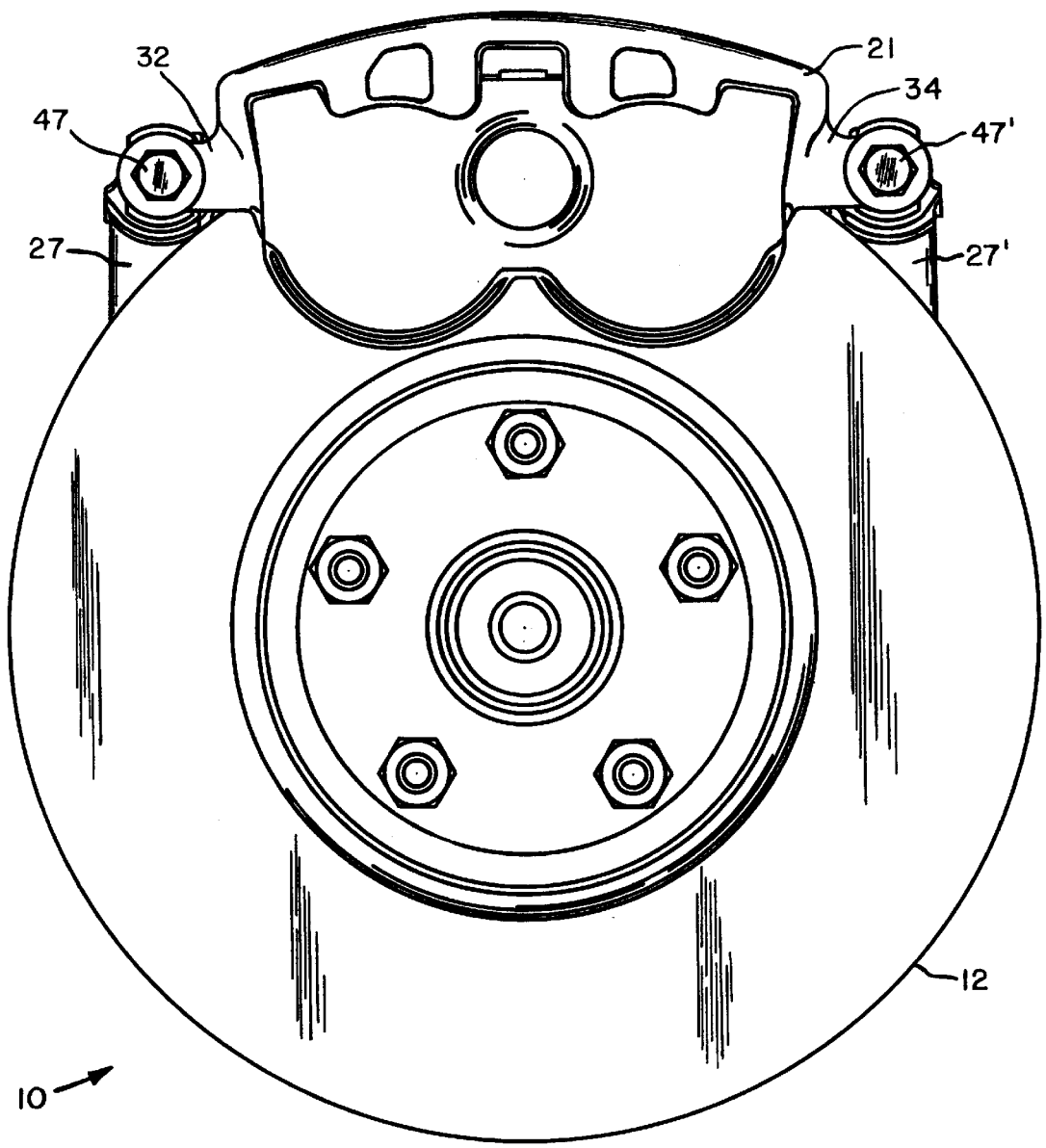
FIG. 1a is a side view of FIG. 1 showing the relationship of the guide pins and carrier member.

The disc brake 10 as best shown in FIGS. 1 and 1a includes a rotor 1 2 having a pair of opposing friction faces 14,1 6 which rotate with an axle. A pair of friction pads 18 and 20 disposed adjacent friction faces 14,16 are urged into braking engagement therewith in response to a force developed by hydraulic fluid acting on a piston retained in caliper 21 during a brake application.

The caliper 21 slides with respect to a anchor bracket or carrier 22 by means of first 24 and second 26 axial guide pins. The carrier 22 being fixed to a vehicle and the first 24 and second 26 axial guide pins are slidably fixed to arms 27 and 27' of caliper 21. The first guide pin 24 is located in a first bore 28 in boss 32 of carrier 22 while the second guide pin 26 is located in a second corresponding bore in boss 34 of carrier 22.

In more particular detail, guide pins 24 and 26 are identical and as a result only guide pin 24 will be described in detail and where needed the same number is used for corresponding component with respect to guide pin 26.

Guide pin 24 has a head section 36 with a general cylindrical shaft 38 extending therefrom. Head section 36 has identical first 40 and second 42 flats or locking surfaces 40 and 42, see FIG. 2, one of which is designated to engage surface 44 on caliper 21. As illustrated in FIG. 1, locking surfaces 44,44' on caliper 21 is located in a plane substantially parallel to each other. A bolt 47 extends through opening 45 in arm 27 to secure guide pin 24 to caliper 21 and position guide pin 24 in a desired orientation with respect to carrier 22. In addition, it should be understood that opening 45 is designed to have a slightly larger diameter than bolt 47 to compensate for manufacturing tolerances between carrier 22 and caliper 21.

Shaft 38 on guide pin 24 has a first bearing groove 46 located adjacent end 25, a seal groove 50 located adjacent shoulder 52 of head section 36 and a second bearing groove 48 located between seal groove 50 and the first bearing groove 46. A bellows 54 has a first bead 56 located in seal groove 50 and a second bead 58 located in a groove 60 on carrier 22. When shaft 38 is positioned in bore 28 bellows 54 prevents contamination from being communicated to bore 28.

Guide pin 24 is aligned in bore 28 by first 62 and second 64 resilient bearings. Resilient bearings 62 and 64 are identical and only bearing 62 is hereinafter described in detail in conjunction with FIG. 3. Bearing 62 has a cylindrical body made of alternating first 66,66' and second 68,68' resilient segments. The first segment 66 is made of a first elastomeric material having a first coefficient of resiliency while the second segment 68 is made of a second elastomeric material having a second coefficient of resiliency. The first segment 66 has a plurality of axial slots 70,70'71,71' which extend along the entire length of the bearing 62 to provide a flow path for air from the bottom 29 of bore 28 to bellows 54. Since the material for the first segment 66 has a higher resiliency than the material for the second segment 68 a correspondingly greater resistance to radial movement of pin 24 is provided than with respect to tangential movement.

In assembling the disc brake 10, guide pins 24 and 26 are initially located in corresponding bores 28 (only one of which is shown) in the anchor bracket or carrier member 22. Friction pads 18 and 20 are aligned with respect to friction faces 14 and 16 on rotor 12 and caliper 21 positioned on carrier 22. A first bolt 46 which extends through opening 45 in arm 32 is secured to head 36 of guide pin 24. Thereafter, a second bolt 47' which extends through opening 45' is secured to head 36' of guide pin 26. Because openings 45,45' are slightly larger than bolts 47,47' any dimensional differences caused by manufacturing tolerances can be compensated for to assure that friction pads 18 and 20 are aligned with friction faces 14 and 16 while at the same time allowing caliper 21 to freely move with respect to carrier 22 by way of guide pins 24 and 26 sliding without binding in bores 28 within carrier 22. Locking surfaces 40 and 42 on head 36,36' of guide pins 24 and 26 assure that the first segment 66,66' on bearings 62 and 64 remain in a desired aligned position to provide greater resistance to movement is provided along a radial plane extending from the axis of rotor 12 than is provided along a tangential arc extending through the center of guide pins 24 and 26.

FIG. 4 illustrates another embodiment of the invention wherein the shaft 100 for a guide pin 124 has a rectangular shape and a cylindrical bearing 162 is made of a single resilient material. The locking surface on head 36 holds the rectangular shape such that the length along a tangential arc is greater than along a radial section to position a greater volume or thickness of material in a radial plane that in an arcuate plane. The greater thickness of resilient material in the radial plane provides a lower stiffness than the lessor thickness of material in the tangential plane such that vibratory forces are attenuated in a different manner than dynamic forces developed during braking.

Figure 9:
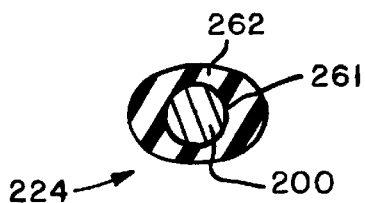
FIG. 9 is a sectional view of still another bearing embodiment for use in the disc brake.

FIG. 9 illustrates another embodiment of the invention wherein a shaft for a guide pin 224 has a circular shape and a bearing member 262 has an oval cross-section with a central circular opening 261. Bearing member 262 is designed to be located in a corresponding oval bore in an anchor bracket or carrier member. In this embodiment, the bearing material is uniform resilient material, however the volume or thickness of material along a radial plane through the axial center of the guide pin 224 is greater than along a tangential arc. As with the bearing structure 162, bearing 262 providing greater resistance to radial movement than to arcuate movement to attenuate vibrations while maintaining pin 224 in axial alignment with respect to rotor 12.

FIGS. 5 and 6 illustrate a still further embodiment of the invention wherein guide pin 324 has a axial shaft 338 with first 366,366' and second 368,368' segments of different resilient materials axially extending from adjacent a seal groove to the end thereof. A layer of material 367,367' and 369,369' having a low coefficient of friction is respectively placed on the top of the segments 366,366' and 368,368'. The layer is designed to provide for low resistance to movement of guide pins 324 in a bore of the carrier 322 such that movement of a caliper is substantially only controlled by the force developed by the reaction of pistons in the caliper to pressurized fluid.

FIGS. 7 and 8 illustrate a still further guide pin 424 for use in a disc brake wherein a layer of resilient material 466 is sandwiched between first 444 and second 446 arcuate strips of that make up shaft 438. Shaft 438 has an oval cross-section as best shown in FIG. 7 and is designed to be located in a circular bore 28 such greater stiffness is provided along a radial plane than in a tangential plane.

We claim:

1. A disc brake having a guide pin attached to a caliper and located in a bore of a carrier, said carrier member and caliper moving with respect to each other in response to a force developed by a piston for urging friction pads into engagement with a rotor to effect a brake application, said guide pin being characterized by a head having a shaft extending therefrom; and a plurality of first and second axial segments which consecutively engage said shaft, said first axial segments having a different coefficient of elasticity than said second axial segments, said first and second axial segments contacting said housing surrounding said bore such that said guide pin has a different stiffness to dampen vibration forces than dimensional variations caused by dynamic stress experienced during a brake application.

2. The disc brake as recited in claim 1 wherein said segments are characterized by being secured to said shaft, said first and second segments each having a metallic layer which engages said bore to provide for ease in axial movement between said carrier and caliper member.

3. A disc brake having a guide pin attached to a caliper and located in a bore of a carrier member, said carrier member and caliper moving with respect to each other in response to a force developed by a piston for urging friction pads into engagement with a rotor to effect a brake application, said guide pin being characterized by a head having a shaft extending therefrom and bearing means with a cylindrical member located between said shaft and housing surrounding said bore, said cylindrical member having alternating first and second segments for providing said guide pin with a different resistance of stiffness to forces in a radial plane than in a tangential plane.

4. A disc brake having a guide pin attached to a caliper and located in a bore of a carrier member, said carrier member and caliper moving with respect to each other in response to a force developed by a piston for urging friction pads into engagement with a rotor to effect a brake application, said guide pin being characterized by a head having a shaft extending therefrom and bearing means located between said shaft and housing surrounding said bore for providing a different stiffness in a radial plane than in a tangential plane, said bearing means including a resilient cylindrical member having a rectangular axial opening, said shaft having a first groove adjacent a first end with parallel first and second flats for receiving said rectangular axial opening in said cylindrical member, said parallel first flats being aligned in a radial plane with respect to said rotor while said parallel second flats are aligned in a tangential plane with respect to said rotor, said cylindrical member providing greater resistance to radial movement than to arcuate movement to attenuate vibrations while maintaining said pin is axial alignment with respect to said rotor.

5. The disc brake as recited in claim 4 wherein said head is characterized by a locking surface which engages said caliper to prevent rotations with respect to bore to maintain said parallel first flats in said radial plane.

6. A disc brake having a guide pin attached to a caliper and located in a bore of a carrier member, said carrier member and caliper moving with respect to each other in response to a force developed by a piston for urging friction pads into engagement with a rotor to effect a brake application, said guide pin being characterized by a head having a shaft extending therefrom and bearing means located between said shaft and housing surrounding said bore for providing a different stiffness in a radial plane than in a tangential plane, said bearing means including a resilient member having an oval cross-section with a cylindrical axial opening, said shaft having a first groove adjacent a first end for receiving said cylindrical axial opening in said resilient member, said resilient member being aligned in said bore of said caliper such that greater resistance to is provided with respect to radial movement of said pin than is provided to arcuate movement.

\* \* \* \* \*